Patented Nov. 29, 1932

1,889,702

UNITED STATES PATENT OFFICE

VICTOR SCHOLZ, OF LEIPZIG-MOLKAU, GERMANY, ASSIGNOR OF ONE-HALF TO THE FIRM ATLAS AGO CHEMISCHE FABRIK, AKTIENGESELLSCHAFT, OF LEIPZIG, GERMANY

PLASTIC COMPOUND

No Drawing. Application filed March 27, 1929, Serial No. 350,432, and in Germany May 22, 1925.

My invention relates to a process of producing a homogeneous solid solution of linoxyn and nitrocellulose, constituting a novel composition of matter which is of manifold utility and may be employed, more particularly, in the manufacture of a rubber-like or horn-like material and articles therefrom such as buttons, shoe parts and the like.

Another object of my invention is to provide a horn-like material adapted to be applied by pressure to a fabric base for the manufacture of linoleum or artificial leather or similar articles. Another object is to produce a solution of nitrocellulose and linoxyn which constitutes a homogeneous viscous liquid adapted for use as an impregnating agent, an adhesive, a cement, a dressing material or the like.

Linoxyn is a substance consisting of oxidized and polymerized oil, particularly linseed oil, and is extensively employed in the manufacture of linoleum as it constitutes the main component thereof. At present, two different processes are being used on an industrial scale for producing linoxyn, to wit, the Walton-process and the Taylor-process. However, my invention is in no way limited to the product resulting from these two processes, but may just as well be applied to linoxyn resulting from any other process.

It is well known in the art that linoxyn is soluble in certain organic solvents such as tetraline or ethylene-trichloride at an elevated temperature.

It is not possible, however, to make use of such solvents in order to obtain a homogeneous solution of linoxyn and nitrocellulose. Now I have found that linoxyn, for instance the kind produced by the Walton or Taylor process, is directly soluble in a thick nitrocellulose jelly and will form with the same a new homogeneous transparent substance having other properties of solution than either of its components. This new composition of matter, when dried, constitutes a rubber-like or horn-like substance depending on the ratio of admixture of its components, i. e. linoxyn and nitrocellulose.

A preferred form of carrying out my novel method is as follows:

A kneading machine is charged with one part linoxyn and one part of nitrocellulose—jelly, prepared with acetic ether, and is then put in operation until the mixture assumes a homogeneous character. The solvent of the jelly, i. e. the acetic ether in the described example is then removed from the mixture by any suitable method, for instance applying suction or by blowing air through the mass.

The residue is a plastic powder-like material which is soluble in certain organic solvents at ordinary temperature, no pressure being required for causing the material to dissolve. Suitable solvents are mixtures of alcohol with acetic ether or with acetone or with methyl-acetate. In this regard, the novel substance differs from linoxyn as the latter is not soluble in such mixtures at ordinary temperature and without pressure.

I believe that the residue represents a compound of linoxyn with nitrocellulose in which the former is combined with the latter by its peroxide groups.

The residue left in the kneading machine after drying the mixture may be employed for various purposes. It may be solidified and united by pressure at ordinary or elevated temperature, to obtain a translucent mass which is either elastic or horn-hard depending on the ratio of admixture of the two components. From this mass, articles such as shoe parts, buttons, handles and the like may be formed or pressed.

Moreover, instead of solidifying and uniting the residue left in the kneading machine, I may directly apply the same in a layer to fabrics, such as felt and the like, and unite it with the same by application of pressure, for instance by means of rollers or presses, at ordinary or elevated temperature, for instance in a manner similar to that in which the base material of linoleum or India rubber is rolled onto fabrics for manufacturing linoleum or artificial leather. As the material solidified by pressure is translucent, it may be desirable to add dyes and filling materials, such as fibres (e. g. linters), in order to render the material opaque or colored. I prefer to add such dyes and filling materials to the mixture, while it is being operated upon in the kneading machine.

Instead of drying the mixture and solidifying it by pressure, I may dilute it by any of the above-mentioned solvents in order to obtain impregnating substances, coating substances, glutinous and putty-like material, dressing or adhesive means. If it is desired that the product have a considerable toughness in addition to hardness, I add to the mixture in the kneading machine a small quantity of a solution (f. i. in benzol) of waste india-rubber. I have found that such an addition renders the product particularly tough.

Instead of diluting the mixture before it is dried, I may dissolve the dried product before or after it has been solidified by pressure.

What I claim is:

1. The method which comprises stirring a mixture having, as one constituent, a linoxyn which is free of any solvents and having, as another constituent, a swelling of nitrocellulose in a volatile solvent, said stirring being continued until said mixture assumes a homogeneous viscous liquid state.

2. The method which comprises stirring a mixture having, as one constituent, a linoxyn which is free of any solvents and having, as another constituent, a swelling of nitrocellulose in a volatile solvent, said stirring being continued until said mixture assumes a homogeneous viscous liquid state, and subsequently evaporating said volatile solvent to obtain a horn-like residue.

3. The method which comprises stirring a mixture having, as one constituent, a linoxyn which is free of any solvents and having, as another constituent, a swelling of nitrocellulose in a volatile solvent, said stirring being continued until said mixture assumes a homogeneous viscous liquid state, subsequently evaporating said volatile solvent to obtain a horn-like residue, and converting the latter by pressure into a translucent mass.

4. The method set forth in claim 3 in which the last step is carried out at an elevated temperature.

5. As a new composition of matter a solution of linoxyn in a swelling of nitrocellulose.

6. As a new composition of matter a solution of linoxyn in nitrocellulose.

In testimony whereof I have signed my name to this specification.

VICTOR SCHOLZ.